United States Patent
Nishi et al.

(10) Patent No.: US 8,949,515 B2
(45) Date of Patent: Feb. 3, 2015

(54) STORAGE DEVICE AND MEMORY CONTROLLER

(75) Inventors: Masataka Nishi, Mito (JP); Ryo Fujita, Hitachi (JP); Ryoichi Inada, Hitachi (JP); Takuma Nishimura, Hitachi (JP); Masahiro Shiraishi, Hitachi (JP); Koji Matsuda, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 13/512,958

(22) PCT Filed: Dec. 1, 2010

(86) PCT No.: PCT/JP2010/071429
§ 371 (c)(1),
(2), (4) Date: May 31, 2012

(87) PCT Pub. No.: WO2011/068109
PCT Pub. Date: Jun. 9, 2011

(65) Prior Publication Data
US 2012/0246399 A1    Sep. 27, 2012

(30) Foreign Application Priority Data
Dec. 3, 2009   (JP) .................................. 2009-275048

(51) Int. Cl.
*G06F 12/02*    (2006.01)

(52) U.S. Cl.
CPC .... *G06F 12/0246* (2013.01); *G06F 2212/7203* (2013.01)
USPC .......................................... 711/103; 711/206

(58) Field of Classification Search
None
See application file for complete search history.

(56) References Cited

U.S. PATENT DOCUMENTS

| | | |
|---|---|---|
| 5,524,230 A | 6/1996 | Sakaue et al. |
| 5,745,418 A | 4/1998 | Ma et al. |
| 5,933,368 A | 8/1999 | Ma et al. |
| 7,315,916 B2 | 1/2008 | Bennett et al. |

(Continued)

FOREIGN PATENT DOCUMENTS

| | | |
|---|---|---|
| JP | 5-27924 A | 2/1993 |
| JP | 2002-157149 A | 5/2002 |

(Continued)

OTHER PUBLICATIONS

German-language Office Action dated Jan. 11, 2013 with English translation (Ten (10) pages).
Corresponding International Search Report with English Translation dated Mar. 1, 2011 (six (6) pages).

*Primary Examiner* — Gary Portka
(74) *Attorney, Agent, or Firm* — Crowell & Moring LLP (57) ABSTRACT

Disclosed is a storage device using non-volatile semiconductor memory that achieves high performance and long life for the device. When managing the non-volatile semiconductor memory (2), physical blocks are classified into three types: scratch blocks (22), data blocks (23), and erased blocks (24). Data writing from a host device (3) is performed on the scratch blocks. When the number of empty pages within a scratch block becomes less than a predetermined number or no longer exists, the block is treated thereafter as a data block, and one of the erased blocks is newly assigned as a scratch block. If there are insufficient erased blocks, a block with relatively less valid data is selected from among the data blocks. After copying all valid data included in the block to a scratch block, the block is erased, and thus an erased block is acquired.

8 Claims, 9 Drawing Sheets

(56) References Cited

U.S. PATENT DOCUMENTS

| | | |
|---|---|---|
| 7,451,265 B2 * | 11/2008 | Traister et al. ............... 711/103 |
| 8,380,944 B2 * | 2/2013 | Dumitru et al. ............... 711/156 |
| 2006/0143365 A1 | 6/2006 | Kikuchi |
| 2006/0161722 A1 | 7/2006 | Bennett et al. |
| 2007/0033328 A1 * | 2/2007 | Sinclair et al. ............... 711/103 |
| 2007/0124531 A1 | 5/2007 | Nishihara |
| 2009/0055618 A1 | 2/2009 | Nakanishi et al. |
| 2009/0271562 A1 | 10/2009 | Sinclair |
| 2011/0055455 A1 * | 3/2011 | Post et al. .................... 711/103 |

FOREIGN PATENT DOCUMENTS

| | | |
|---|---|---|
| JP | 2002-513484 A | 5/2002 |
| JP | 2004-78902 A | 3/2004 |
| JP | 2007-334852 A | 12/2007 |
| JP | 2008-146254 A | 6/2008 |
| JP | 2008-524705 A | 7/2008 |
| JP | 2008-217208 A | 9/2008 |
| JP | 2009-116465 A | 5/2009 |
| WO | WO 2006/065566 A1 | 6/2006 |
| WO | WO 2007/013372 A1 | 2/2007 |

* cited by examiner

|  | 1521 | 1522 | 1523 |
|---|---|---|---|
|  | Scratch block number | Flag | Physical block number |
|  | Scratch block 1 | 0 | null |
|  | Scratch block 2 | 0 | null |
|  | ⋮ | ⋮ | ⋮ |
|  | Scratch block n | 0 | null |

Initial state

FIG.7B

|  | 1521 | 1522 | 1523 |
|---|---|---|---|
|  | Scratch block number | Flag | Physical block number |
|  | Scratch block 1 | 0 | null |
|  | Scratch block 2 | 1 | Block α |
|  | ⋮ | ⋮ | ⋮ |
|  | Scratch block n | 0 | null |

State with block of scratch block allocated

FIG.7C

|  | 1521 | 1522 | 1523 |
|---|---|---|---|
|  | Scratch block number | Flag | Physical block number |
|  | Scratch block 1 | 0 | null |
|  | Scratch block 2 | 0 | Block α |
|  | ⋮ | ⋮ | ⋮ |
|  | Scratch block n | 0 | null |

State with block of scratch block disabled

FIG.8A Initial state

FIG.8B State with block of data block generated

FIG.8C State with block of data block erased

FIG.9A

Initial state

FIG.9B

State with erased block
allocated as scratch block

FIG.10A

| Physical block number 1551 | Number of erase times 1552 | Valid data page count 1553 | Valid data page flag 1554 | Writable page number 1555 |
|---|---|---|---|---|
| Block 1 | 0 | 0 | 0000···0000 | 0 |
| Block 2 | 0 | 0 | 0000···0000 | 0 |
| ⋮ | ⋮ | ⋮ | ⋮ | ⋮ |
| Block n | 0 | 0 | 0000···0000 | 0 |

Initial state

FIG.10B

| Physical block number 1551 | Number of erase times 1552 | Valid data page count 1553 | Valid data page flag 1554 | Writable page number 1555 |
|---|---|---|---|---|
| Block 1 | 0 | 1 | 0000···0001 | 1 |
| Block 2 | 0 | 0 | 0000···0000 | 0 |
| ⋮ | ⋮ | ⋮ | ⋮ | ⋮ |
| Block n | 0 | 0 | 0000···0000 | 0 |

State with data written

FIG.10C

| Physical block number 1551 | Number of erase times 1552 | Valid data page count 1553 | Valid data page flag 1554 | Writable page number 1555 |
|---|---|---|---|---|
| Block 1 | 1 | 0 | 0000···0000 | 0 |
| Block 2 | 0 | 0 | 0000···0000 | 0 |
| ⋮ | ⋮ | ⋮ | ⋮ | ⋮ |
| Block n | 0 | 0 | 0000···0000 | 0 |

State with block erased

STORAGE DEVICE AND MEMORY CONTROLLER

FIELD OF THE INVENTION

The present invention relates to: a storage device using a non-volatile semiconductor memory; and a memory controller for controlling the non-volatile semiconductor memory in the storage device.

BACKGROUND ART

A magnetic disk storage device is generally used as an auxiliary storage device for information equipment. The magnetic disk storage device performs a read and a write of data on a unit of storage basis, which is called a sector.

A storage device using a semiconductor memory as a storage medium has been increasing in these years, instead of the above-described magnetic disk storage device. In particular, a storage device using a flash memory, a type of EEPROM (Electrically Erasable Programmable Read only Memory), has become a mainstream of the semiconductor memory storage device.

A flash memory is excellent in reading and writing data faster than a magnetic disk. However, there are four major limitations in using a flash memory. First, a unit of write (which is generally referred to as a page) and a unit of erase (which is generally referred to as a block) are predetermined and the unit of erase is larger than the unit of write. Second, in overwriting data, it is required to first erase existing data, and then rewrite new data. Third, in writing data into a single block consisting of plural pages, the data needs to be written on the pages sequentially in numerical order of the pages. And fourth, there is a limit to the number of erase times of each block.

One of the memory control methods based on such characteristics of the above-described flash memory is disclosed in which a plurality of pages constituting a physical block are divided into a data page on which data is held and an alternate page on which new data can be added. The method performs processings of writing a new write data into an alternate page, and, if the alternate page becomes full, copying only a valid data in the block into an empty block, and then erasing the block having the already-copied valid data [Patent Document 1]. In another similar method, one or more new blocks are set instead of the aforementioned alternate page [Patent Document 2].

[Patent Document 3] discloses a method in which: a block having fewer already-written data pages is searched each time a write operation is performed; a data is written into the searched block; in the meantime, a block having the largest number of pages with invalid data is searched; and the searched block is selected as a block to be erased.

RELATED ART DOCUMENT

Patent Documents

[Patent Document 1] Japanese Laid-Open Patent Application, Publication No. 2009-116465
[Patent Document 2] Japanese Translation of PCT International Application Publication No. 2008-524705
[Patent Document 3] Japanese Laid-Open Patent Application, Publication No. 2002-157149

SUMMARY OF THE INVENTION

Problems to be Solved by the Invention

In a conventional technique proposed in [Patent Document 1], each time an alternate page in a write block becomes full, it is necessary to collect both the data copy processing of the valid data contained in the selected block to be erased, and data which are not contained in the selected block to be erased and are consecutive in order of logical addresses; rearrange the collected data; and perform a write of appropriate data. This requires associated copy operations. Because the number of times of rewriting data to a flash memory is limited, even if the number of rewritable pages is decreased due to those data copy operations, a lifetime of the flash memory is shortened accordingly. Another problem is that a write speed from an external system to a target storage device becomes slow. Various methods proposed in [Patent Document 2] also have similar problems.

In another conventional technique proposed in [Patent Document 3], data is uniformly written into all blocks, which makes the numbers of valid data pages between the blocks approximately the same. This brings about a problem that, in spite of the proposed method of selecting a block to be erased, the number of valid data to be copied is not sufficiently reduced.

The present invention has been made in an attempt to provide: a storage device which achieves a long lifetime and a high-level performance and which reduces an amount of data to be copied in rewriting and the number of times of block erase performed upon the data copying; and a memory controller which controls a non-volatile semiconductor memory in the storage device.

Means for Solving the Problems

To solve the above-described problems, a storage device of the present invention is characterized as follows. The storage device includes: a non-volatile semiconductor memory that has a prescribed unit of write and a unit of block erase which is larger than the prescribed unit of write; a memory from which data is readable and to which data is writable; and a memory controller that performs a read and a write from and to the non-volatile semiconductor memory based on an instruction from an external system. A storage area of the non-volatile semiconductor memory includes a scratch block including one or more physical blocks, a data block including one or more physical blocks, and an erased block including one or more physical blocks. The memory has respective tables for managing the scratch block, the data block, and the erased block. The storage device writes a data from the external system to a block of the scratch block, takes the block of the scratch block as a block of the data block if the block of the scratch block has blank pages fewer than a prescribed number of pages or runs out of blank pages, allocates any one of the blocks of the erased block as a new block of the scratch block, and, if there is no available block of the erased block, selects a block having fewer valid data pages from among the blocks of the data block, copies valid data in the selected block of the data block, into the newly-allocated block of the scratch block, and erases the selected block of the data block.

The storage device of the present invention is further characterized by managing the data block and the scratch block for each logical space created by dividing each of the data block and the scratch block in given volume.

The storage device of the present invention is further characterized as follows. The storage device has, in the memory, a table in which a logical address uniquely specified by dividing a logical address space by the unit of write is made to be associated with a physical address in the non-volatile semiconductor memory. The memory controller rewrites the table based on a data write instruction from the external system.

The storage device of the present invention is further characterized by having, in the memory, a table in which the number of erase times and a valid data page in each block of the physical block are stored.

To solve the above-described problems, a memory controller of the present invention is characterized as follows. The memory controller performs a read processing and a write processing from and to a non-volatile semiconductor memory and a read processing and a write processing from and to a memory thereof, based on an instruction from an external system. The memory controller: handles a storage area of the non-volatile semiconductor memory as including a scratch block including one or more physical blocks, a data block including one or more physical blocks, and an erased block including one or more physical blocks; has a table for managing the data block in the memory; writes a data from the external system to a block of the scratch block; if a block of the scratch block has blank pages fewer than a prescribed number of pages or runs out of blank pages, takes the block of the scratch block as a block of the data block; allocates any one of the blocks of the erased block as a new block of the scratch block; and, if there is no available block of the erased block, selects a block having fewer valid data pages from among the blocks of the data block, copies valid data in the selected block of the data block, into the newly-allocated block of the scratch block, and erases the selected block of the data block.

The memory controller of the present invention is further characterized by managing the data block and the scratch block for each logical space created by dividing each of the data block and the scratch block in given volume.

The memory controller of the present invention is further characterized as follows. The memory controller has, in the memory, a table in which a logical address uniquely specified by dividing a logical address space by the unit of write is made to be associated with a physical address in the non-volatile semiconductor memory. The memory controller rewrites the table based on a data write instruction from the external system.

The memory controller of the present invention is further characterized by having, in the memory, a table in which the number of erase times and a valid data page in each block of the physical block are stored.

To solve the above-described problems, a storage device of the present invention is characterized by including: a non-volatile semiconductor memory that has units of read and write and a unit of block erase which is larger than the units of read and write; and a memory control part that performs a read and a write from and to the non-volatile semiconductor memory based on an instruction from a host computer.

Herein, a storage area includes: a data block including one or more physical blocks; an erased block including one or more physical blocks; and a scratch block including one or more physical blocks.

Herein, the memory control part controls such that a write data from the host computer or a valid data copied from the data block is written to the scratch block. Further, if there is no available block of the erased block, the memory control part controls such that a block having fewer valid data pages from among blocks of the data block is selected as a block to be erased, a valid data in the block is copied, and the block is erased, to thereby obtain a new block of the erased block.

Advantageous Effects of the Invention

In the present invention, only a valid data page included in a block to be erased is copied. Therefore, additional data copy operations are not necessary, unlike the conventional techniques disclosed in [Patent Document 1] and [Patent Document 2]. In the conventional techniques, each time a block to which data is written becomes full, copy operations are performed which accompany collection and rearrangement of consecutive data in order of logical addresses and a write of appropriate data.

In the present invention, a data block having a sufficiently small valid data page count can be selected. An amount of data to be copied can be therefore reduced compared to the conventional technique disclosed in [Patent Document 3]. The total valid data page count is unchanged in terms of the entire storage device. A write data from the host computer and a valid data contained in a block to be erased is written to a block of the scratch block, to thereby collect a valid data page locally in a block of the scratch block. This can reduce the valid data page count contained in such a block of the data block. Moreover, selection of a block of the data block having fewer valid data pages makes it possible to reduce an amount of data to be copied.

The reduction in an amount of data to be copied allows a long lifetime of the storage device. This can be understood from that a flash memory has a limited number of block erase times and that a write processing to a flash memory consists of only a data write and a page copy. That is, an amount of data to be copied can be reduced which is accompanied by a given number of writes from the host computer, and the number of block erase times can also be reduced.

Further, the reduction in an amount of data to be copied allows a data rewrite speed of the host computer to be faster. This can be understood from that an upper limit of a write speed to a flash memory per unit time is constant and that a write processing to a flash memory consists of only a data write and a page copy. If an amount of page copy operations can be reduced, the number of per-unit-time write times from the host computer can be increased.

EMBODIMENTS FOR CARRYING OUT THE INVENTION

An embodiment of the present invention is described below with reference to related drawings.

Figure 1:
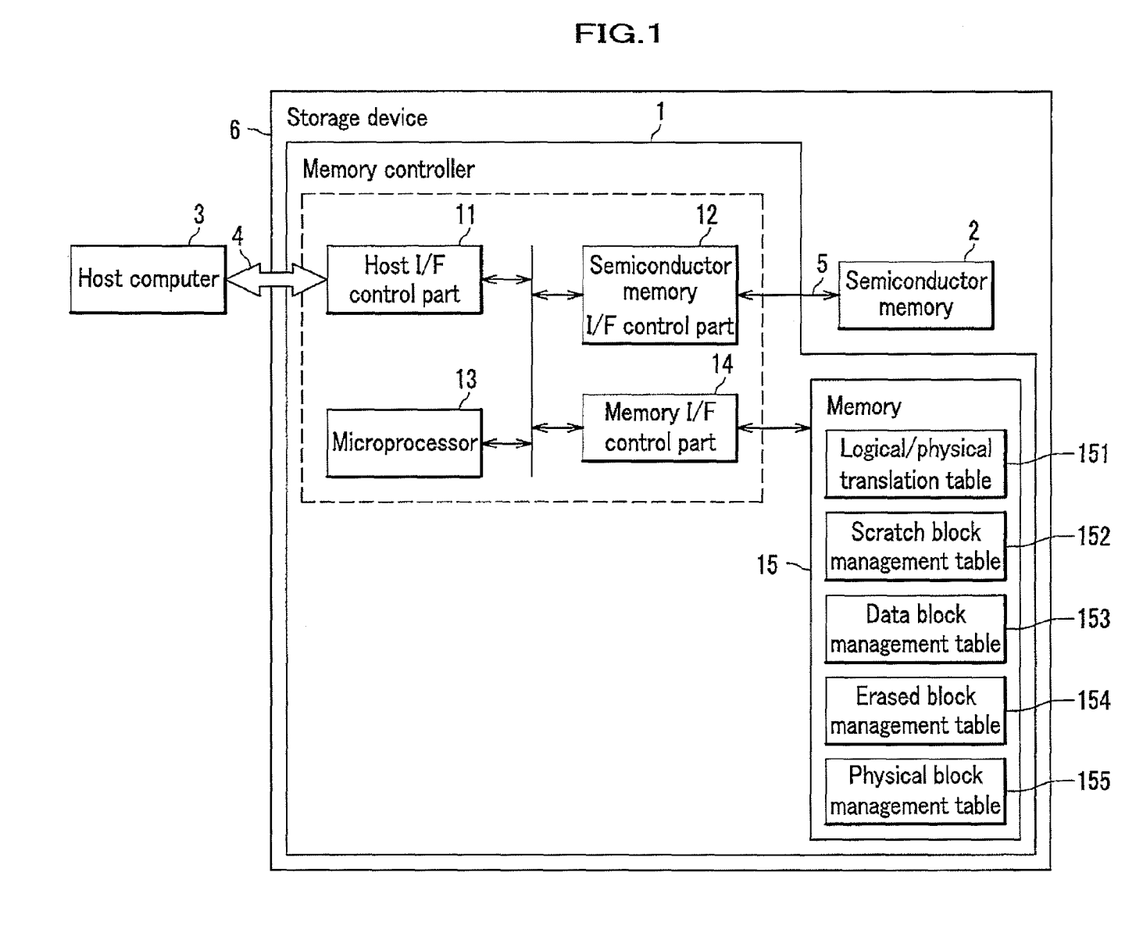
FIG. 1 is a diagram illustrating an example of a hardware configuration according to an embodiment of the present invention.

FIG. 1 is a diagram illustrating an example of a hardware configuration for carrying out the present invention.

In FIG. 1, a storage device 6 is connected to a host computer 3 via a data path 4.

The storage device 6 includes a memory controller 1 and a semiconductor memory 2. The memory controller 1 includes a host I/F (interface) control part 11, a semiconductor memory I/F control part 12, a microprocessor 13, a memory I/F control part 14, and a memory 15. The memory 15 is not necessarily integrated with the memory controller as shown in FIG. 1 and may be configured as a memory chip connected to the memory controller. The memory 15 may be a non-volatile semiconductor memory or a volatile semiconductor memory.

The host I/F control part 11 controls data transmitted to and received from the host computer 3, based on a data read or write instruction from the host computer 3. The data read or write instruction from the host computer 3 is directed to a logical storage area which is associated with a physical storage area in the storage device 6. Upon receipt of the data read or write instruction, the controller 1 performs a data read or write from or to a physical address in the semiconductor memory 2.

The semiconductor memory I/F control part 12 performs access control on the semiconductor memory 2 under instruction from the microprocessor 13. However, if the semiconductor memory 2 is controllable directly from the microprocessor 13, the semiconductor memory I/F control part 12 is not indispensable.

The microprocessor 13 builds a logical storage area corresponding to a physical storage area of the storage device 6, in the semiconductor memory 2 and controls a read and a write processing of data from and to the logical storage area.

The memory I/F control part 14 performs access control on the memory 15 under instruction from the microprocessor 13. However, if the semiconductor memory 2 is controllable directly from the microprocessor 13, the memory I/F control part 14 is not indispensable.

The memory 15 includes a logical/physical translation table 151, a scratch block management table 152, a data block management table 153, an erased block management table 154, and a physical block management table 155.

Before explaining FIG. 2, various tables in the memory 15 are described next.

The logical/physical translation table 151 in the memory 15 makes a logical address specified by an access from the host computer 3 associate with a physical address in the semiconductor memory 2.

Figure 6A:
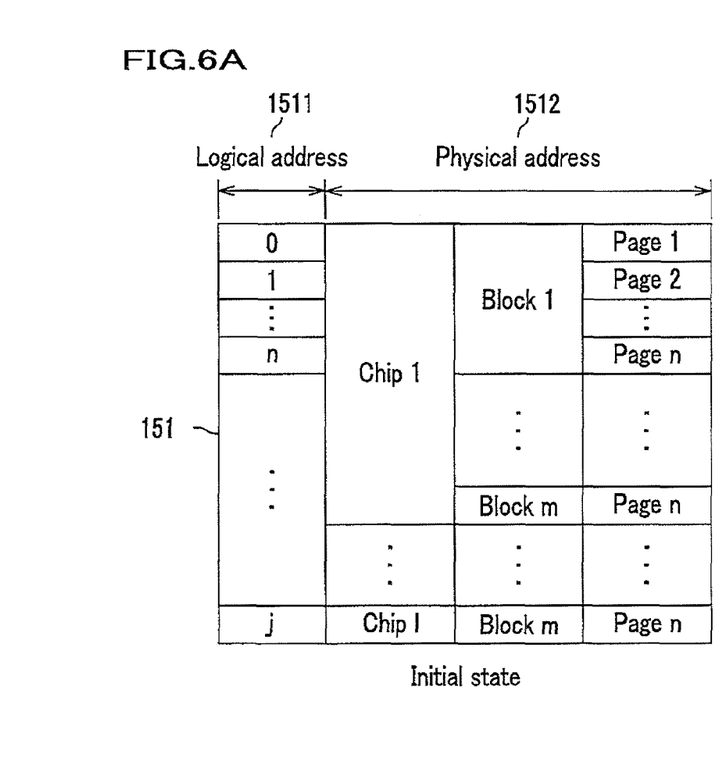
FIGS. 6A and 6B are diagrams illustrating a configuration of a logical/physical translation table.
Figure 6B:
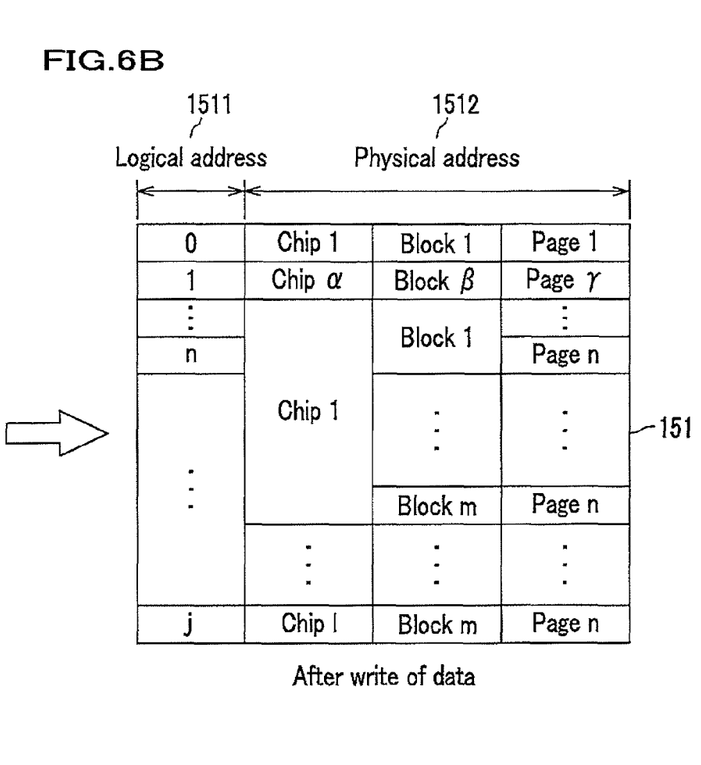

FIGS. 6A and 6B are diagrams illustrating an example of a configuration of the logical/physical translation table 151. FIG. 6A illustrates an initial state. FIG. 6B illustrates a state in which a data has been written and the logical/physical translation table 151 is thereby updated. The logical/physical translation table 151 contains a logical address 1511 specified by an access from the host computer 3 and a physical address 1512 including a chip number, a block number, and a page number in the semiconductor memory 2. In this example, the physical address 1512 includes the chip number. However, if the semiconductor memory 2 is a single chip memory, it is not necessary for the physical address 1512 to include the chip number.

A value in the physical address 1512 changes if a data write processing is performed. For example, if the logical address 1511 is subjected to a data write processing, an initial state as shown in FIG. 6A is changed to a state after a data is written as shown in FIG. 6B.

Figure 7A:
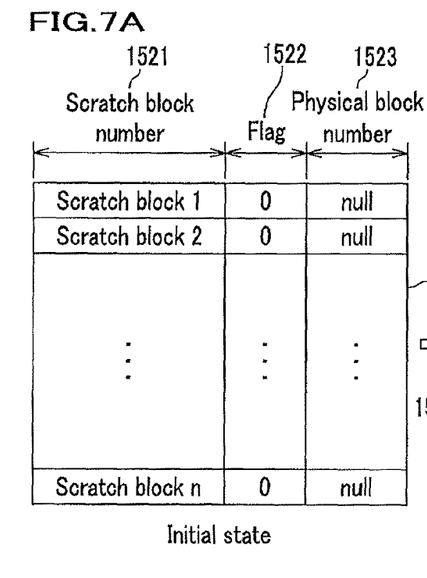
FIGS. 7A, 7B and 7C are diagrams illustrating a configuration of a scratch block management table.
Figure 7B:
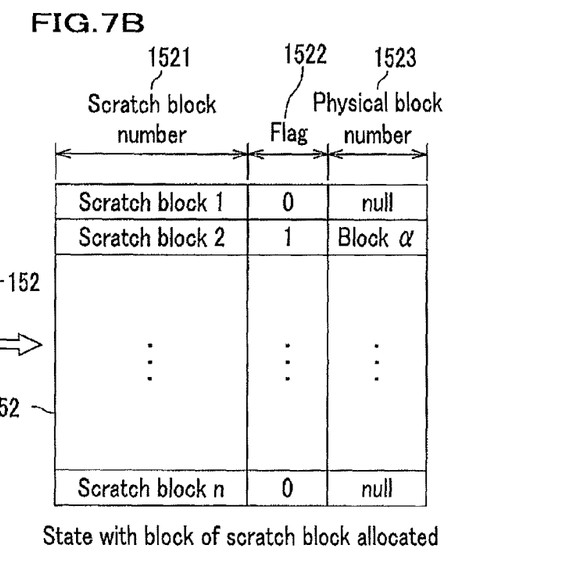
Figure 7C:
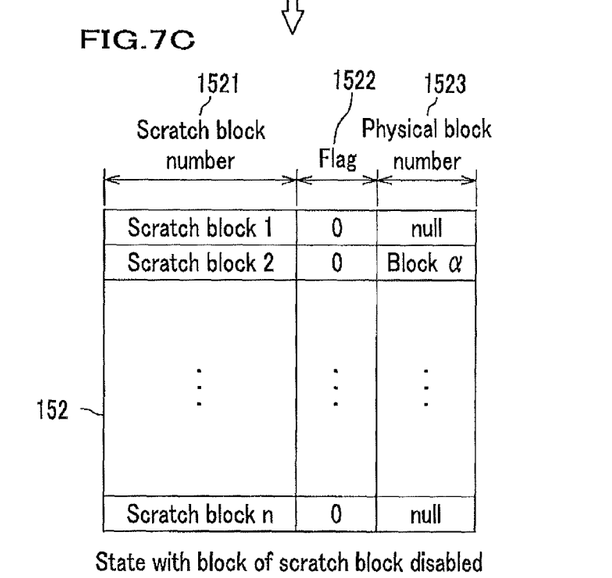

The scratch block management table 152 manages a flag indicating whether or not a scratch block managed for each logical space in given volume is enabled and also manages a number of a physical block taken as a scratch block. FIGS. 7A and 7B illustrate a configuration example of the scratch block management table 152. FIG. 7A illustrates an initial state. FIG. 7B illustrates a state where a new scratch block has been given. FIG. 7C illustrates a state where the scratch block has been changed to a data block.

The scratch block management table 152 contains a scratch block number 1521, a flag 1522, and a physical block number 1523 corresponding to the scratch block number 1521. If a new scratch block is allocated, the flag 1522 thereof is set to 1 as shown in FIG. 7B, to thereby update the physical block number 1523. If a scratch block is changed to a data block, the flag 1522 is set to 0 as shown in FIG. 7C, to thereby disable the scratch block.

Figure 8A:
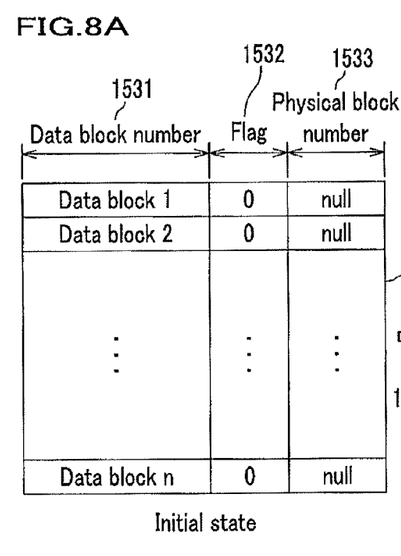
FIGS. 8A, 8B and 8C are diagrams illustrating a configuration of a data block management table.
Figure 8B:
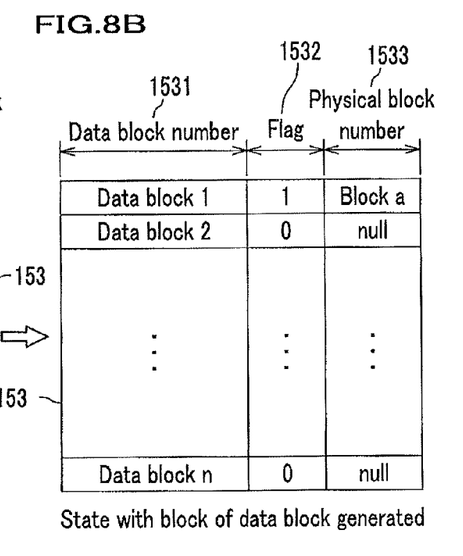
Figure 8C:
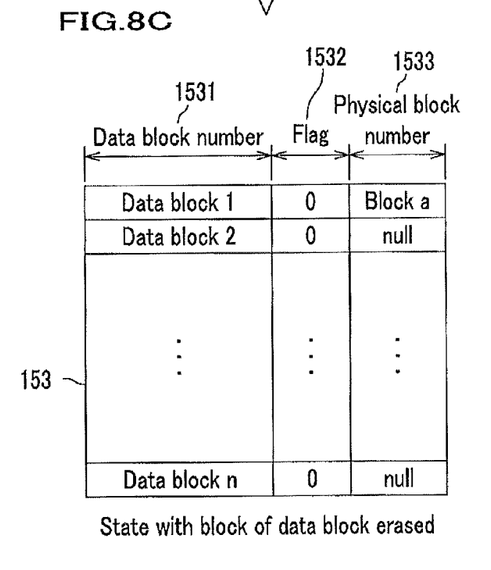

The data block management table 153 manages a flag indicating whether or not a data block managed for each logical space in given volume is enabled and a number of a physical block taken as a data block. FIGS. 8A, 8B, and 8C illustrate a configuration example of the data block management table 153. FIG. 8A illustrates an initial state. FIG. 8B illustrates a state where a scratch block is changed to a data block. FIG. 8C illustrates a state where the data block has been erased.

The data block management table 153 contains a data block number 1531, a flag 1532, and a physical block number 1533 corresponding to the data block number 1531. If there is a physical block newly changed to a data block, the flag 1532 is set to 1 as shown in FIG. 8B, to thereby update the physical block number 1533. If a data block is erased, the flag 1532 is set to 0 as shown in FIG. 8C, to thereby disable the data block.

Figure 9A:
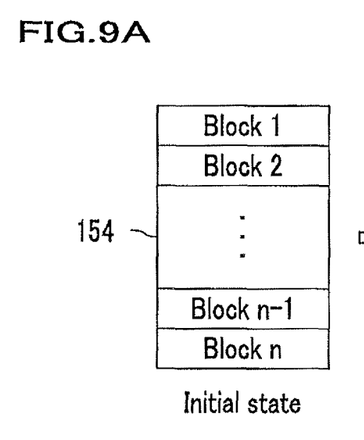
FIGS. 9A and 9B are diagrams illustrating a configuration of an erased block management table.
Figure 9B:
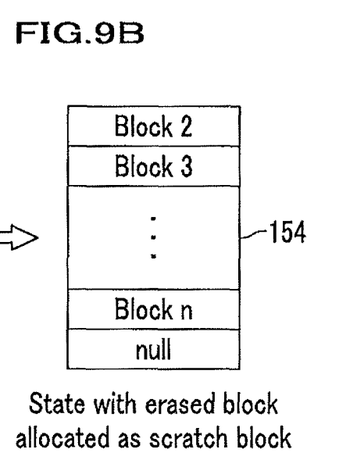

The erased block management table 154 holds a number of a physical block in which data has not yet been written. FIGS. 9A and 9B illustrate a configuration example of the erased block management table 154. FIG. 9A illustrates an initial state. FIG. 9B illustrates a state in which an erased block has been allocated as a scratch block.

The erased block management table 154 contains a number of a physical block in which data has not been written, serially from the top. If a physical block is required to be allocated as a scratch block, for example, the initial state of FIG. 9A is translated into the state of FIG. 9B in which the scratch block has been allocated.

Figure 10A:
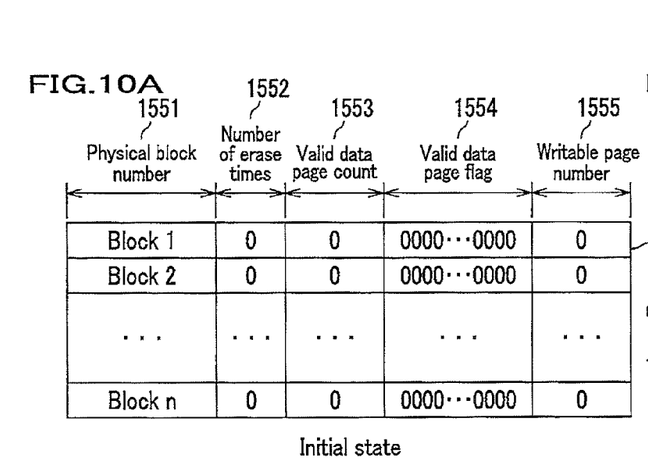
FIGS. 10A, 10B and 10C are diagrams illustrating a configuration of a physical block management table.
Figure 10B:
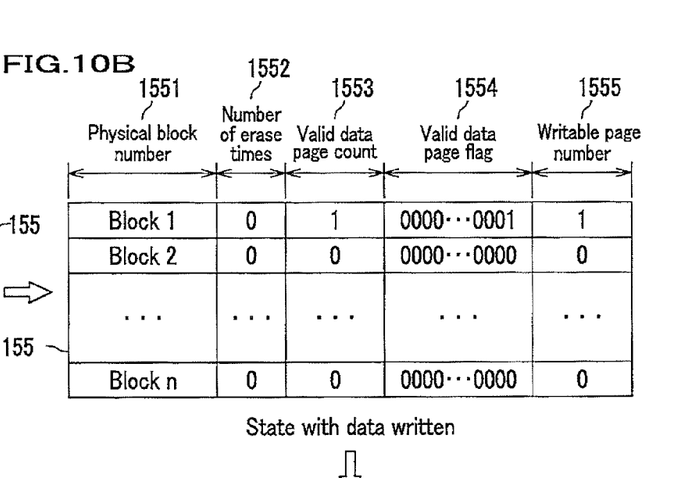
Figure 10C:
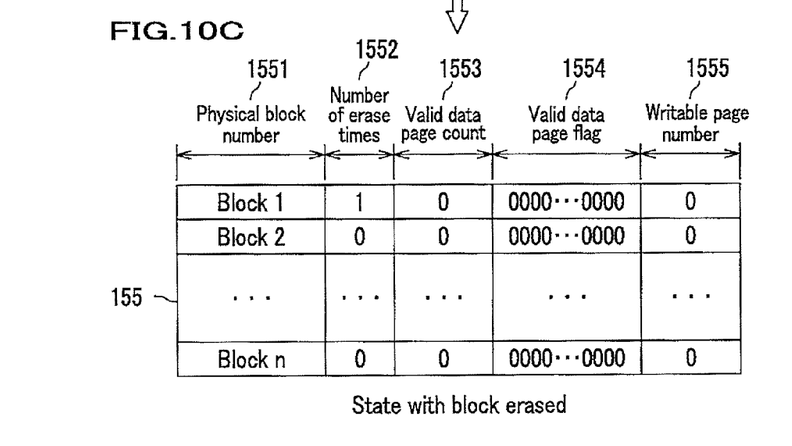

The physical block management table 155 manages the number of erase times, a valid data page count, and a valid data page flag of each physical block. FIGS. 10A, 10B, and 10C illustrate a configuration example of the physical block management table 155. FIG. 10A illustrates an initial state. FIG. 10B illustrates a state in which a valid data has been written. FIG. 10C illustrates a state in which a physical block has been erased.

The physical block management table 155 contains a physical block number 1551, the number of erase times 1552 of the physical block, a valid data page count 1553 thereof, a valid data page flag 1554 thereof, and a writable page number 1555. The valid data page flag 1554 is represented by binary digits with n bits if a page count in the physical block is n. The rightmost bit represents page 0. The leftmost bit represents page n−1. If a value of a bit corresponding to the number of a given page is 0, this means that data in the page is invalid. And, if 1, the data is valid.

The tables in the memory 15 of FIG. 1 are described above. To simplify explanation, note that the semiconductor memory 2 of FIG. 1 is configured as a single unit. However, it is to be understood that either a single unit or plural units of the semiconductor memories 2 are herein applicable by managing a physical storage area in the semiconductor memory 2 in correspondence to a logical storage area in the storage device 6.

Figure 2:
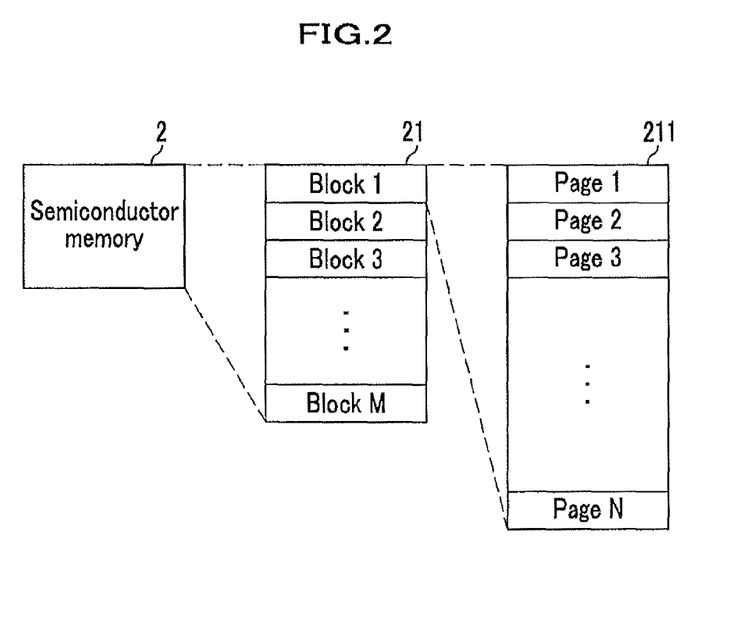
FIG. 2 is an internal configuration of a non-volatile semiconductor memory.

FIG. 2 is an internal configuration of the semiconductor memory 2 used in the embodiment of the present invention. FIG. 2 illustrates a logical storage area in the semiconductor memory 2. The host computer 3 shown in FIG. 1 recognizes only the logical storage area of FIG. 2 with respect to the storage device 6.

In FIG. 2, reference numeral 21 indicates a block which corresponds to a minimum unit of data erase. Similarly, reference numeral 211 indicates a page which corresponds to a minimum unit of a read or a write of data. In FIG. 2, a logical storage area in the semiconductor memory 2 includes one or more blocks 21, and the block 21 includes one or more pages 211. That is, a logical storage area in the semiconductor memory 2 has M blocks 21 from block 1 to block M (wherein the number is an integer). Each of the blocks has N pages from page 1 to page N (wherein the number is an integer).

As described above, the host computer 3 exchanges data with the storage device 6 via the data path 4. Interfaces such as SCSI (Small Computer System Interface) and ATA (Advanced Technology Attachment) are used as the data path 4. In the embodiment of the present invention, however, the data path 4 is not limited to these, and other interface may be used. Similarly, the number of the data path 4 is not limited to one, and a plurality of the data paths 4 may be connected to the memory controller 1.

The semiconductor memory 2 exchanges data with the memory controller 1 via the memory bus 5. The storage device 6 stores data therein based on an instruction from the host computer 3.

Next is described a memory usage state for realizing a memory control method which is one of the characteristic features in the embodiment of the present invention.

Figure 3:
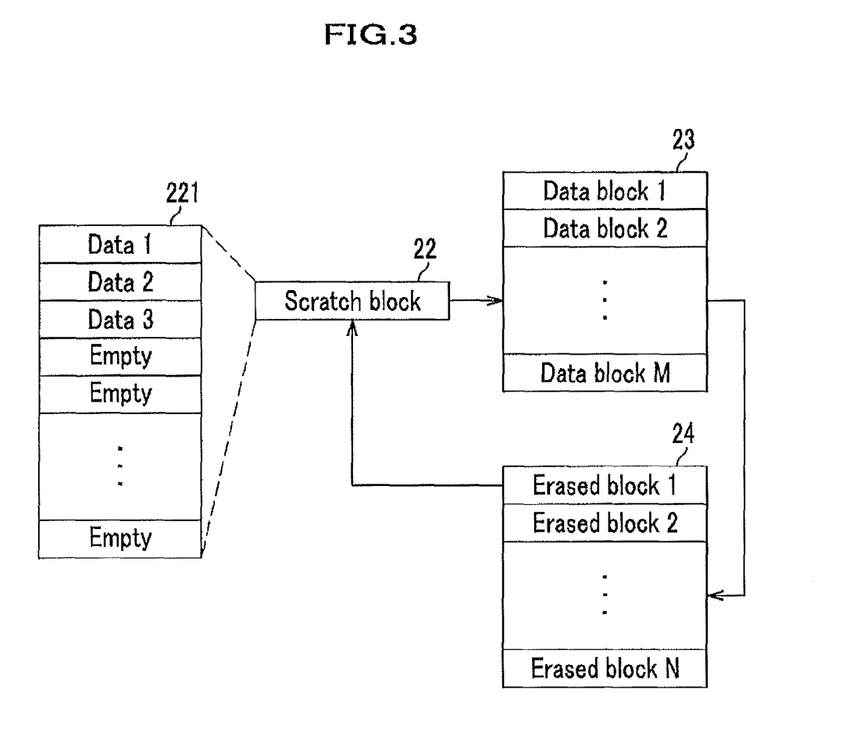
FIG. 3 is a diagram illustrating a usage state of a memory in a memory control method.

FIG. 3 is a diagram illustrating a memory usage state for realizing a memory control method which is one of the characteristic features in the embodiment of the present invention. FIG. 3 illustrates how a logical storage area in the semiconductor memory 2 is handled under control of the memory controller 1.

A logical storage area in the semiconductor memory 2 includes a scratch block 22, a data block 23, and an erased block 24.

The scratch block 22 stores therein data and is constituted by one or more blocks created by dividing a logical storage area in given volume. Each of the created logical storage areas is called a logical group. Reference numeral 221 indicates an internal structure of a block of the scratch block 24. The block of the scratch block 24 has both a page on which data has already been written and a page on which data has not yet been written.

The data block 23 also stores therein data and is constituted by one or more blocks created by dividing a logical storage area in given volume. Data has been written on all pages in the blocks of the data block 23.

The erased block 24 is constituted by one or more blocks each in a state in which data can be written typically up to n pages as a result of a block erase. According to necessity, however, information on block management, for example, the number of erase times of each block may be written in a block of the erased block 24, up to n−1 pages.

Herein, both the scratch block 22 and the data block 23 are data areas readable from a user using the host computer 3. A block of the data block 23 will not be overwritten because data has already been written on all pages of the block. Thus, in writing a new data, the data is written on a page having the smallest page number of a block of the scratch block 22 from among all blank pages thereof.

If data has already been written on all pages of a given block of the scratch block 22, the given block of the scratch block 22 is taken as a block of the data block 23. Then, a block of the erased block 24 is allocated as a new block of the scratch block 22.

If the number of blocks of the erased block 24 is decreased to a prescribed number or smaller, a block of the data block 23 which has smaller valid data page count is selected. Valid data in the selected block is transferred to a block of the scratch block 22. The selected block is then erased and is taken as a block of the erased block 24.

How to determine the number M of blocks of the data block 23 and the number N of blocks of the erased block 24 is not specifically limited herein.

In light of the above-mentioned, operations in the embodiment to which the present invention is applied are described with reference to flowcharts of FIG. 4 and FIG. 5.

Figure 4:
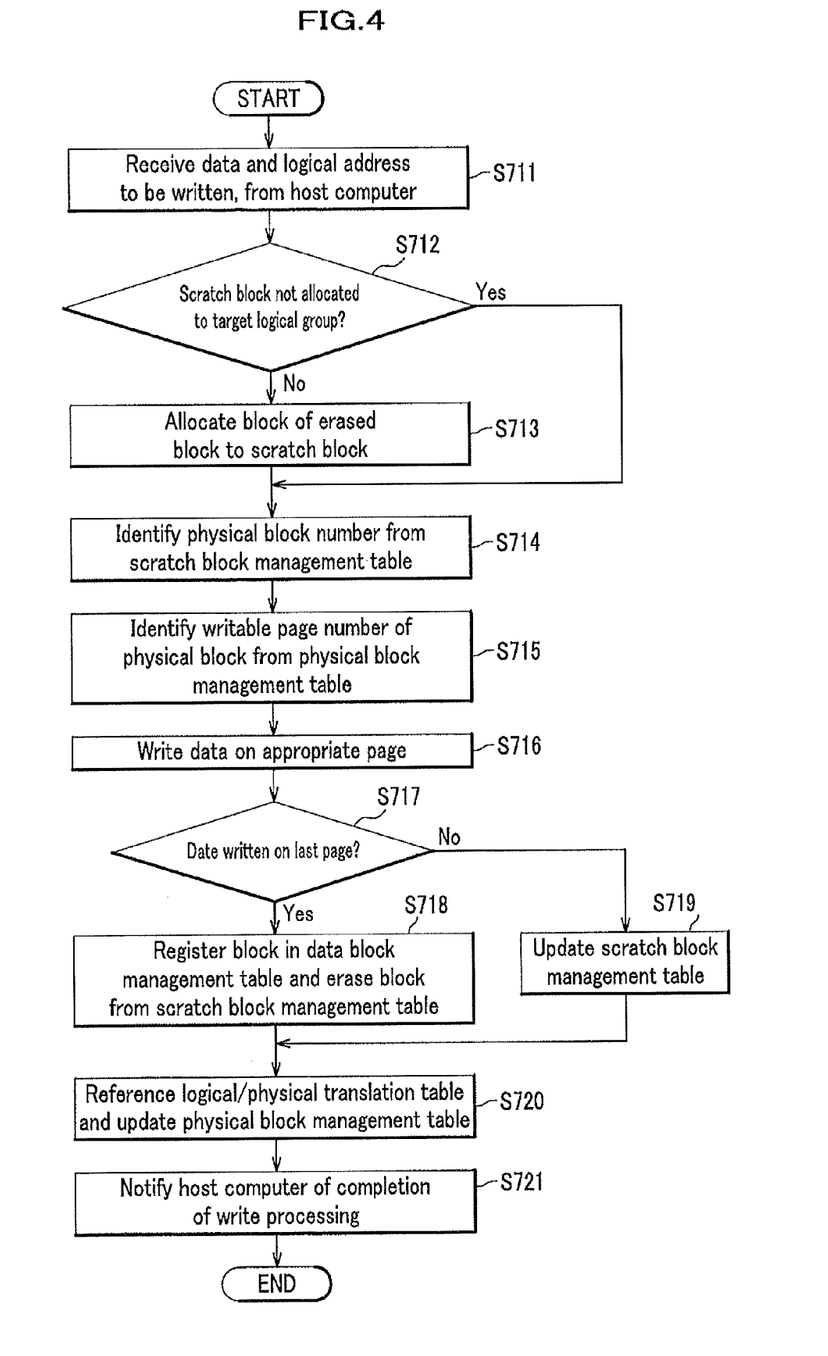
FIG. 4 is a flowchart illustrating a data write processing from a host computer.
Figure 5:
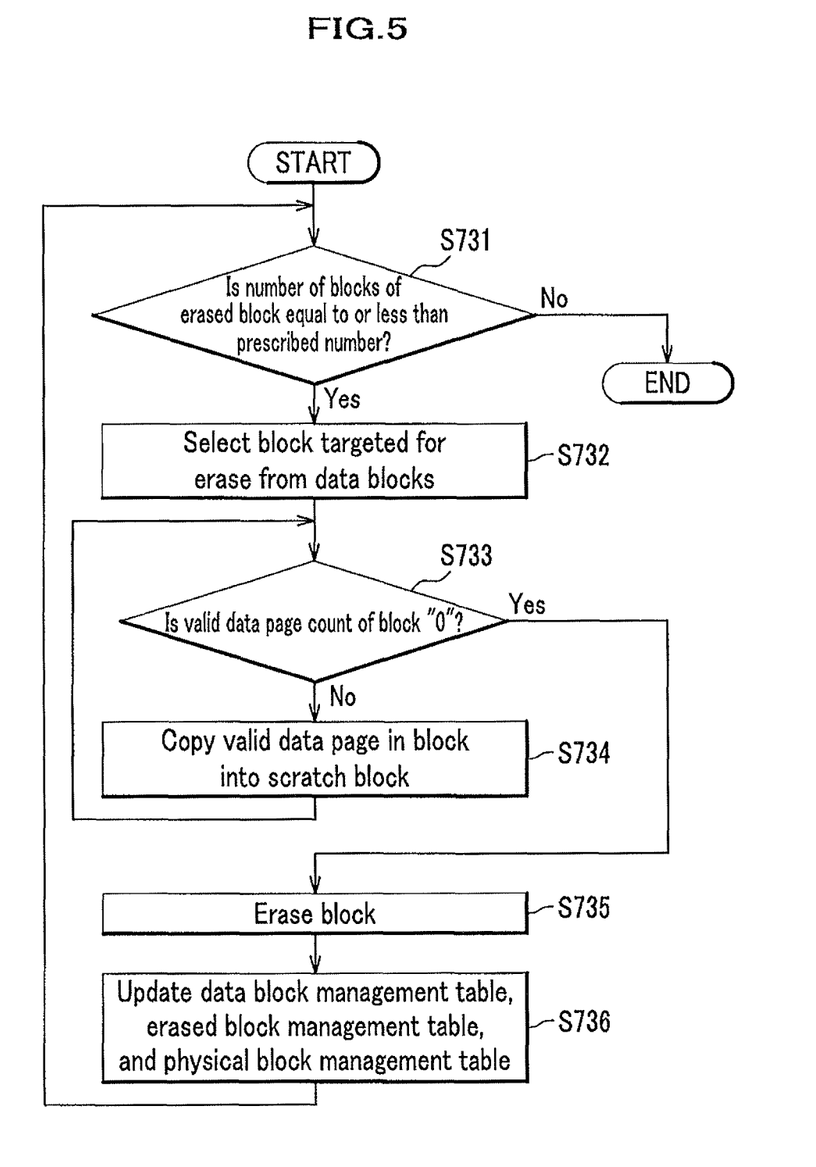
FIG. 5 is a flowchart illustrating a block erase processing.

FIG. 4 and FIG. 5 illustrate steps of a write processing and a block erase processing, respectively, which are characteristic features in the embodiment of the present invention.

First is described a processing performed when the host computer 3 makes a write request with reference to FIG. 4.

[Write Processing]

FIG. 4 is a flowchart of the data write processing from the microprocessor 13 to the semiconductor memory 2. Next is described a flow of the processing.

The microprocessor 13 receives a data and a logical address from the host computer 3 via the host I/F control part 11 (step S711).

The microprocessor 13 then references the scratch block management table 152 so as to identify a physical address in the semiconductor memory 2 into which the data is to be written and acquires the physical block number 1523 corresponding to an appropriate logical address into which the data is to be written (step S714).

If any block of the scratch block 22 is not allocated to the target logical address (if "No" in step S712), the microprocessor 13 selects a block of the erased block 24, registers a number of the selected block as the physical block number 1523 of the scratch block 22, and enables the flag 1522 corresponding thereto (step S713). The microprocessor 13 then acquires the registered physical block number 1523 (step S714).

The microprocessor 13 then references the physical block management table 155, identifies the writable page number 1555 of the block having the acquired physical block number 1523, and generates a physical address from a chip number, a block number, and a page number of the write target block (step S715). The microprocessor 13 then performs the data write processing to the generated physical address (step S716).

The microprocessor 13 then adds the writable page number 1555. The microprocessor 13 herein determines whether or not the data has been written on the last page in the block of the scratch block 22 (step S717). If it is determined that the data has been written on the last page (if "Yes" in step S717), the block of the scratch block 22 is taken as a block of the data block 23. Thus, the microprocessor 13 disables the flag 1522 of the block of the scratch block 24 in the scratch block management table 152 by setting the flag 1522 to 0, registers the physical block number 1533 thereof in the data block management table 153, and enables the flag 1532 (step S718). Note that a condition specified in step S717 of whether or not the data has been written on the last page may be replaced by another condition of whether or not the number of blank pages is smaller than a prescribed page count.

Upon the data write, if the condition specified in step S717 is not satisfied (if "No" in step S717), the microprocessor 13 only updates the scratch block management table 152 (step S719).

The microprocessor 13 then references the physical block management table 155, adds the valid data page count 1553 of the physical block number 1551 corresponding to a number of the physical block to which the data is written, and enables an appropriate page portion corresponding thereto of the valid data page flag 1554. The microprocessor 13 also references the logical/physical translation table 151, reads the physical address 1512 corresponding to the logical address as the write target, and determines whether or not the valid data page flag 1554 in the physical block management table 155 is enabled. If enabled, the microprocessor 13 subtracts the valid data page count 1553 of the physical block number 1551 corresponding to the physical address 1512 and disables an appropriate page portion corresponding thereto of the valid data page flag 1554. The microprocessor 13 then registers the write physical address as the physical address 1512 corresponding to the logical address 1511 of the logical/physical translation table 151 (step S720).

The microprocessor 13 notifies the host computer 3 via the host I/F control part 11 that the write processing has been completed and terminates the write processing (step S721).

[Block Erase Processing]

Next is described a flow of the block erase processing with reference to a flowchart of FIG. 5.

The microprocessor 13 starts the block erase processing if the number of blocks of the erased block 24 becomes equal to or smaller than a prescribed number (if "Yes" in step S731).

The microprocessor 13 references the data block management table 153 and acquires one or more registered physical block numbers 1533. The microprocessor 13 references the valid data page count 1553 of the physical block number 1551 in the physical block management table 155, corresponding to the acquired physical block number 1533, and identifies a block having the smallest valid data page count of the one or more physical blocks registered in the data block 23 (step S732).

The microprocessor 13 then checks whether or not a valid data page count of the physical block is 0 (step S733). If the valid data page count is not 0, the microprocessor 13 references the valid data page flag 1554 in the physical block management table 155 and copies a data on an appropriate valid data page to a block of the scratch block 22 (step S734). The microprocessor 13 repeats the copy operation until the valid data page count 1553 reaches 0. If the valid data page count 1553 reaches 0, the microprocessor 13 erases the physical block (step S734).

The microprocessor 13 then disables the flag 1532 of the physical block number 1553 corresponding to the erased block number in the data block management table 153 and cancels the registration of the physical block from the data block management table 153. The microprocessor 13 then registers the erased physical block number into the erased block management table 154 and adds the number of erase times 1552 of the physical block number 1551 corresponding to the erased block number in the physical block management table 155.

The microprocessor 13 then repeats the above-described processing until the number of blocks of the erased block 24 exceeds a prescribed number.

INDUSTRIAL APPLICABILITY

The present invention is applicable to a storage device used in a computer system and a memory controller thereof.

DESCRIPTION OF REFERENCE NUMERALS 1 memory controller
2 semiconductor memory
3 host computer
4 data path
5 memory bus
6 storage device
11 host I/F control part
12 semiconductor memory I/F control part
13 microprocessor
14 memory I/F control part
15 memory
21 block
22 scratch block
23 data block
24 erased block
151 logical/physical translation table
152 scratch block management table
153 data block management table
154 erased block management table
155 physical block management table
211 page
221 internal structure of a scratch block
1511 logical address
1512 physical address
1521 scratch block number
1522, 1532 flag
1523, 1533, 1551 physical block number
1531 data block number
1552 number of erase times
1553 valid data page count
1554 valid data page flag
1555 writable page number

The invention claimed is:
1. A storage device, comprising:
a non-volatile semiconductor memory that has a prescribed unit of write and a unit of block erase which is larger than the prescribed unit of write;
a memory from which data is readable and to which data is writable; and
a memory controller that performs a read and a write from and to the non-volatile semiconductor memory based on an instruction from an external system,
wherein a storage area of the non-volatile semiconductor memory includes: a scratch block including one or more physical blocks; a data block including one or more physical blocks; and an erased block including one or more physical blocks,
wherein the memory has respective tables for managing the scratch block, the data block, and the erased block, and
wherein the storage device
writes a data from the external system to a block of the scratch block,
takes the block of the scratch block as a block of the data block if the block of the scratch block has blank pages fewer than a prescribed number of pages or runs out of blank pages,
allocates any one of the blocks of the erased block as a new block of the scratch block, identifies, from among the blocks of the data block, candidate blocks in which data has been written in all pages thereof, and if a number of blocks of the erased block is decreased to a prescribed number or smaller, selects a candidate block having a smallest number of valid data pages only from among the candidate blocks of the data block, copies valid data in the selected candidate block of the data block into the newly-allocated block of the scratch block, and erases the selected candidate block of the data block, wherein selection of the candidate block from among the candidate blocks prevents a block having a blank page from being selected.

2. The storage device according to claim 1,
wherein the storage device manages the data block and the scratch block for each logical space divided in given volume.

3. The storage device according to claim 1,
wherein the storage device has, in the memory, a table in which a logical address uniquely specified by dividing a logical address space by the unit of write is made to be associated with a physical address in the non-volatile semiconductor memory, and wherein the memory controller rewrites the table based on a data write instruction from the external system.

4. The storage device according to claim 1,
wherein the storage device has, in the memory, a table in which the number of erase times and a valid data page in each block of the physical block are stored.

5. A memory controller performing a read processing and a write processing from and to a non-volatile semiconductor memory and a read processing and a write processing from and to a memory thereof, based on an instruction from an external system, wherein the memory controller
handles a storage area of the non-volatile semiconductor memory as including a scratch block including one or more physical blocks, a data block including one or more physical blocks, and an erased block including one or more physical blocks, has a table for managing the data block in the memory;

writes a data from the external system to a block of the scratch block;

if a block of the scratch block has blank pages fewer than a prescribed number of pages or runs out of blank pages, takes the block of the scratch block as a block of the data block;

allocates any one of the blocks of the erased block as a new block of the scratch block;

identifies, from among the blocks of the data block, candidate blocks in which data has been written in all pages thereof, and if a number of blocks of the erased block is decreased to a prescribed number or smaller, selects a candidate block having a smallest number of valid data pages only from among the candidate blocks of the data block, copies valid data in the selected candidate block of the data block into the newly-allocated block of the scratch block, and erases the selected candidate block of the data block, wherein selection of the candidate block from among the candidate blocks prevents a block having a blank page from being selected.

6. The memory controller according to claim 5,
wherein the memory controller manages the data block and the scratch block for each logical space divided in given volume.

7. The memory controller according to claim 5,
wherein the memory controller has, in the memory, a table in which a logical address uniquely specified by dividing a logical address space by the unit of write is made to be associated with a physical address in the non-volatile semiconductor memory, and wherein the memory controller rewrites the table based on a data write instruction from the external system.

8. The memory controller according to claim 5,
wherein the memory controller has, in the memory, a table in which the number of erase times and a valid data page in each block of the physical block are stored.

* * * * *